(12) United States Patent
Roper et al.

(10) Patent No.: US 11,173,464 B2
(45) Date of Patent: Nov. 16, 2021

(54) METHODS FOR DISSOLVING DROPLET PARTICLE ASSEMBLY WITH CO-SOLVENT, AND PARTICLE ASSEMBLIES OBTAINED THEREFROM

(71) Applicant: HRL Laboratories, LLC, Malibu, CA (US)

(72) Inventors: Christopher S. Roper, Oak Park, CA (US); Shanying Cui, Calabasas, CA (US); Adam F. Gross, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 263 days.

(21) Appl. No.: 16/411,061

(22) Filed: May 13, 2019

(65) Prior Publication Data

US 2020/0030767 A1 Jan. 30, 2020

Related U.S. Application Data

(60) Provisional application No. 62/711,726, filed on Jul. 30, 2018.

(51) Int. Cl.
*B01J 13/10* (2006.01)
*B82Y 30/00* (2011.01)
*B82Y 40/00* (2011.01)

(52) U.S. Cl.
CPC ........... *B01J 13/10* (2013.01); *B82Y 30/00* (2013.01); *B82Y 40/00* (2013.01)

(58) Field of Classification Search
CPC . B01J 13/02; B01J 13/04; B01J 13/10; B82Y 30/00; B82Y 40/00
See application file for complete search history.

(56) References Cited

U.S. PATENT DOCUMENTS 6,450,189 B1 9/2002 Ganan-Calvo
9,981,240 B1 5/2018 Roper et al.
(Continued)

FOREIGN PATENT DOCUMENTS

CN 105602545 A 5/2015
WO 2016157742 A1 10/2016

OTHER PUBLICATIONS

PCT/US2019/032095 International Search Report and Written Opinion dated Sep. 11, 2019.
(Continued)

*Primary Examiner* — Jennifer Wecker
*Assistant Examiner* — Jonathan Bortoli
(74) *Attorney, Agent, or Firm* — O'Connor & Company

(57) ABSTRACT

Some variations provide a method of assembling a plurality of particles into particle assemblies, comprising: (a) obtaining a first fluid containing particles and a solvent for the particles; (b) obtaining a second fluid not fully miscible with the first fluid; (c) obtaining a third fluid that is a co-solvent for the first fluid and the second fluid; (d) combining the first fluid and the second fluid to generate an emulsion containing droplets of the first fluid in the second fluid; (e) adding the third fluid to the emulsion; and (f) dissolving out the solvent from the droplets into the third fluid, thereby forming particle assemblies. Some variations also provide an assembly of nanoparticles, wherein the assembly has a volume from 1 μm³ to 1 mm³, a packing fraction from 20% to 100%, and/or an average relative surface roughness less than 1%, wherein the assembly is not disposed on a substrate.

27 Claims, 5 Drawing Sheets

(56) References Cited

U.S. PATENT DOCUMENTS

| | | |
|---|---|---|
| 2008/0213593 A1 | 9/2008 | Subramaniam et al. |
| 2009/0283711 A1* | 11/2009 | Chapel ..................... C09C 3/08 |
| | | 252/62.2 |
| 2012/0309904 A1 | 12/2012 | Xu et al. |
| 2014/0065234 A1 | 3/2014 | Shum et al. |
| 2015/0280241 A1 | 10/2015 | Hara et al. |
| 2016/0051958 A1 | 2/2016 | Kung et al. |
| 2016/0139090 A1 | 5/2016 | Schoonen et al. |

OTHER PUBLICATIONS

Cho et al., "Microwave-Assisted Self-Organization of Colloidal Particles Inside Water-in-Oil Emulsions" Journal of Dispersion Science and Technology, 31:169-176, 2010.
Zhang et al., "Self-Assembly Kinetics of Colloidal Particles inside Monodispersed Micro-Droplet and Fabrication of Anisotropic Photonic Crystal Micro-Particles" Crystals 2016, 6, 122; doi:10.3390/cryst6100122.
Wang et al., "Droplet Microfluidics for the Production of Microparticles and Nanoparticles" Micromachines 2017, 8, 22; doi:10.3390/mi8010022.
Su et al., "One-step fabrication of silica colloidosomes with in situ drug encapsulation" RSC Advances (RSC Publishing) RSC Adv., 2016, 6, 112292-112299 DOI:10.1039/C6RA19048K.
Wintzheimer et al., "Supraparticles: Functionality from Uniform Structural Motifs" ACS Nano 2018, 12, 5093-5120.
PCT/US2019/032100 International Search Report and Written Opinion dated Apr. 21, 2020.

* cited by examiner

METHODS FOR DISSOLVING DROPLET PARTICLE ASSEMBLY WITH CO-SOLVENT, AND PARTICLE ASSEMBLIES OBTAINED THEREFROM

PRIORITY DATA

This patent application is a non-provisional application claiming priority to U.S. Provisional Patent App. No. 62/711,726, filed on Jul. 30, 2018, which is hereby incorporated by reference herein.

STATEMENT REGARDING FEDERALLY SPONSORED RESEARCH OR DEVELOPMENT

This invention was made with Government support under DARPA Contract No. FA8650-15-C-7549. The Government has certain rights in this invention.

FIELD OF THE INVENTION

The present invention generally relates to methods for assembling particles, and assemblies of particles.

BACKGROUND OF THE INVENTION

Tightly packed, organic-free arrays of nanoparticles are useful for optical, magnetic, electronic device, and pharmaceutical applications, among others. Applications include drive motors, windshield wiper motors, starter motors, pumps, and actuation devices. The macroscopic assembly of magnetic nanoparticles is useful for such magnetic devices.

Furthermore, assemblies of nanoparticles are useful for altering the wetting and icing on surfaces as well as for creating optically scattering or diffractive coatings, useful for cameras, for example.

Micron-sized lenses, prisms, and retroreflectors are useful for chip-scale infrared and visible optics. There is no way to grind lens materials down to 10 micron sizes, for example.

There are existing approaches for forming packed nanoparticles, but they do not form these assemblies in solution without organic ligands. That is, arrays of nanoparticles from crystallization methods are usually surrounded by organic ligands that interfere with further chemical processing and can limit durability. Organic ligands typically melt from heat and darken in the presence of light. This lack of thermal and optical stability makes avoiding organic ligands crucial for environmentally robust structures.

Also, existing approaches for forming packed nanoparticles do not form microassemblies with a high degree of perfection (smoothness and sphericity) and size selectivity.

Agglomerated nanoparticles may be formed without organic ligands by adjusting the pH of a solution of dispersed nanoparticles with an acid or base solution to near the isoelectric point of the nanoparticles. However, these nanoparticles will not be tightly packed.

Nanoparticles may be formed in an array requiring a substrate. In these approaches, nanoparticles are packed via drying from a solution (colloidal crystals) or electrophoresis, both requiring a substrate. Colloidal crystals are formed by dispersing colloids in a solution and drying on a substrate or spin coating on a substrate. Moreover, electrophoresis does not always result in tightly packed nanoparticles.

Arrays of nanoparticles may be grown in an array on a substrate from a process with gaseous reactants. Arrays of nanoparticles may be formed through a wet chemical process. In one approach, metals or oxides are deposited in the pores of anodic alumina or mesoporous silica. This approach forms either single layers of nanorods or nanorods that have empty space between them and no material between the rods. This results in a low density of material and reduced efficacy from the array.

The packed arrays of nanoparticles, as taught in the prior art, tend to be non-uniform in array size and shape. In order to be useful in larger devices, arrays of assembled particles should be uniform in size and shape. This is necessary for either bottom-up assembly processes, such as self-assembly into larger assemblies; for top-down assembly processes, such as pick-and-place assembly onto patterned substrates; or for combinations of bottom-up and top-down assembly.

There is a desire for monodisperse, tightly packed, smooth, and organic ligand-free microassemblies of nanoparticles. These microassemblies will be useful for optical, magnetic, and electronic device applications, among others. Methods to make these microassemblies are sought.

SUMMARY OF THE INVENTION

The present invention addresses the aforementioned needs in the art, as will now be summarized and then further described in detail below.

Some variations provide a method of assembling a plurality of particles into particle assemblies, the method comprising:
  (a) obtaining a first fluid containing particles and a solvent for the particles;
  (b) obtaining a second fluid, wherein the first fluid is not fully miscible in the second fluid;
  (c) obtaining a third fluid that is a co-solvent for the first fluid and the second fluid;
  (d) combining the first fluid and the second fluid to generate an emulsion containing a dispersed phase of droplets of the first fluid in the second fluid;
  (e) adding the third fluid to the emulsion; and
  (f) dissolving the solvent from the droplets into a mixture of the second fluid and the third fluid, thereby forming particle assemblies.

In some embodiments, the particles are present in the first fluid in a concentration from about 1 mg/mL to about 100 mg/mL.

In some embodiments, the first fluid has a solubility in the second fluid from about 0.01 vol % to about 20 vol %.

In some embodiments, the first fluid has a solubility in the third fluid from about 1 vol % to about 100 vol % (completely miscible).

In some embodiments, the second fluid has a solubility in the third fluid from about 10 vol % to about 100 vol % (completely miscible).

The solvent in the first fluid may be selected from the group consisting of water, dimethyl formamide, diethyl formamide, acetonitrile, dimethyl sulfoxide, methanol, ethanol, isopropanol, 1-propanol, isobutanol, 1-butanol, 2-butanol, t-butanol, acetone, tetrahydrofuran, and combinations thereof.

The second fluid may be an alcohol, a ketone, an ester (e.g., an aliphatic ester), an alkane (e.g., a cyclic alkane), or an acetate (e.g., an alkyl acetate), for example. In some embodiments, the second fluid is selected from the group consisting of methyl laurate, 1-butanol, t-butanol, 1-octanol, 1-hexanol, 1-decanol, ethyl ether, dibutyl ether, dihexyl ether, dioctyl ether, methyl t-butyl ether, methyl ethyl ketone, cyclohexane, ethyl acetate, and combinations thereof.

The third fluid may be an alcohol, a ketone, an ester (e.g., an aliphatic ester), an alkane (e.g., a cyclic alkane), or an acetate (e.g., an alkyl acetate), for example. In some embodiments, the third fluid is selected from the group consisting of 1-octanol, 1-butanol, t-butanol, 1-hexanol, 1-decanol, ethyl ether, dibutyl ether, dihexyl ether, dioctyl ether, methyl t-butyl ether, methyl ethyl ketone, cyclohexane, ethyl acetate, and combinations thereof.

An interface-stabilization substance (e.g., a surfactant) may be contained within the first fluid and/or the second fluid.

In some embodiments, the particles contain a starting ligand and are ligand-exchanged to render the particles soluble in the first fluid, before or during step (a). For example, the particles may be ligand-exchanged to replace a starting ligand (e.g., a starting organic ligand) with an inorganic ligand selected from the group consisting of thiocyanate, borofluoride, hexafluorophosphate, and combinations thereof.

The method may further include adjusting pH of the first fluid, prior to step (d). The pH of first fluid may be adjusted for particle suspendibility, or to inhibit electrostatic assembly, or to induce multi-particle co-assembly, for example.

In some embodiments, step (d) includes a step selected from the group consisting of vortex mixing, ultrasonic mixing, impeller mixing, microfluidizing, microfluidics droplet generation, porous-glass droplet generation, and combinations thereof.

In some embodiments, steps (d), (e), and (f) are continuous. In other embodiments, steps (d), (e), and (f) are conducted in batch.

In step (f), the droplets may be agitated, such as by electrostatic repulsion, Brownian motion, sonication, and/or bulk mixing (e.g., with an internal agitator or by vessel rotation).

Step (f) may be conducted for a dissolving time from about 1 second to about 10 hours, for example.

Step (f) may be conducted at a dissolving temperature from about −15° C. to about 150° C. The temperature may be as low as a temperature just above the freezing point of the fluid mixture.

In step (f), the number of the particle assemblies may be equal to the number of the droplets. In some embodiments, the number of the particle assemblies is less than the number of the droplets.

Some variations of the invention provide an assembly of nanoparticles, wherein the assembly has a volume from 1 $\mu m^3$ to 1 $mm^3$, a packing fraction from 20% to 100%, and an average relative surface roughness less than 5% or less than 1%, wherein the assembly is preferably not disposed on a substrate.

In some embodiments, the packing fraction is at least 90%.

In some embodiments, the average relative surface roughness is less than 0.1%.

The assembly may be spherical or non-spherical. In some embodiments, the assembly has an aspect ratio of at least 1.2.

In some embodiments, the assembly is a core-shell assembly.

The assembly may contain a material selected from the group consisting of metals, metal oxides, metal fluorides, metal sulfides, metal phosphides, ceramics, glasses, polymers, and combinations thereof. Preferably, the assembly is free of organic ligands.

In certain embodiments, the assembly is spherical and consists essentially of lead(II) sulfide nanoparticles.

DETAILED DESCRIPTION OF EMBODIMENTS OF THE INVENTION

Figure 1:
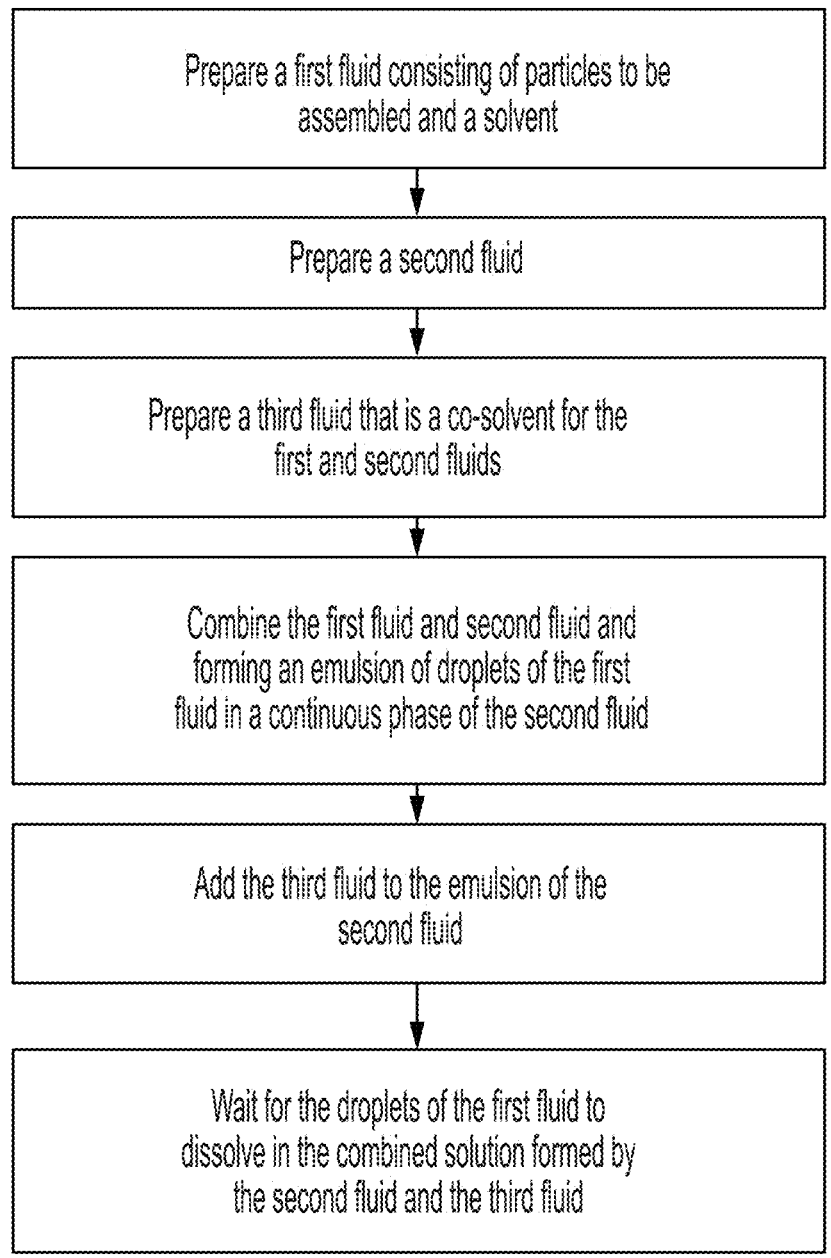
FIG. 1 is an exemplary method flowchart for assembling particles, in some embodiments of the invention.

The compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Some variations of the present invention provide methods for assembling particles into tightly packed structures with controlled order and complexity. An emulsion of particle-containing droplets is created, followed by dissolution of the liquid phase in the particle-containing droplets, causing particle assembly. Distinct solvents are utilized for the assembly process, wherein the solvent for droplet formation is different than the co-solvent for droplet dissolution. This increases control of the dissolving-droplet process and enables a much broader set of materials to be assembled.

For example, assembly of oxidation-sensitive nanoparticles (e.g. PbS or PbSe nanoparticles), or nanoparticles which are not highly hydrophilic (e.g. nanoparticles with thiocyanate ligands), has not been possible with single-solvent, dissolving-droplet methods known in the art.

The smoothness achievable with the methods of the invention makes these materials useful as optical components, such as wavelength-specific scatterers, lenses, prisms, and retroreflectors. For example, assembling optical components from nanoparticles enables (i) the use of materials such as laser glasses $LiYF_4$ and $NaYF_4$ that are difficult to grow in large volumes and (ii) the fabrication of discrete optics at a length scale smaller than is possible with traditional machining and polishing. The principles of the invention enable a bottom-up process to produce micro-sized infrared lens materials (e.g., lenses less than 10 microns in thickness).

In preferred embodiments that do not employ organic ligands, infrared-transparent lens materials or other infrared optics may be fabricated, with the benefit that there are no infrared absorptions from organic ligands.

The disclosed methods are amenable to the addition of complex features to the assemblies, such as nanoparticle shells or assembly in confined spaces to form complex morphologies.

Some variations provide tightly-packed, smooth, and organic ligand-free microassemblies of nanoparticles. In some embodiments, the microassemblies are highly spherical, even when the nanoparticles are asymmetric. In some embodiments, the microassemblies are non-spherical. In some embodiments, core-shell microassemblies are provided.

In some embodiments, microassemblies of nanoparticles are utilized for pharmaceutical manufacture.

Some variations provide a method of assembling a plurality of particles into particle assemblies, the method comprising:
(a) obtaining a first fluid containing particles and a solvent for the particles;
(b) obtaining a second fluid, wherein the first fluid is not fully miscible in the second fluid;
(c) obtaining a third fluid that is a co-solvent for the first fluid and the second fluid;
(d) combining the first fluid and the second fluid to generate an emulsion containing a dispersed phase of droplets of the first fluid in the second fluid;
(e) adding the third fluid to the emulsion; and
(f) dissolving the solvent from the droplets into a mixture of the second fluid and the third fluid, thereby forming particle assemblies.

The first fluid contains the particles to be assembled. The concentration of particles in the first fluid may be from about 1 mg/mL to about 100 mg/mL, such as about 5, 10, 20, 30, 40, 50, 60, 70, 80, or 90 mg/mL. Concentrations lower than 1 mg/mL or higher than 100 mg/mL are possible, depending on the rate of assembly, the type of particles, and the desired final microassemblies.

In some embodiments, the average size of the particles is from about 1 nanometer to about 100 microns. The "average size" is the average diameter for spherical particles or the average effective diameter for non-spherical particles (effective diameter is the cube root of $6V/\pi$, where V is the particle volume). In certain embodiments, the particles are nanoparticles with an average size from about 1 nanometer to about 1000 nanometers, such as from about 5 nm to about 1000 nm, about 10 nm to about 1000 nm, about 50 nm to about 1000 nm, or about 100 nm to about 1000 nm. In certain preferred embodiments, all of the particles are nanoparticles. The particle size is the particle diameter for spherical particles, or length or effective diameter for other particle geometries. In some embodiments, all of the particles have substantially similar size.

Particles sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images. Finally, sieving is a conventional technique of separating particles by size.

Generally, nanoparticles may be round, cylindrical, elliptical, diamond-shaped, tetragonal, tetragonal bipyramidal, cubic, or hexagonal prism structures wherein the ratio between the shortest and longest dimension is 1:1 to 1:5. The nanoparticles may be symmetric or asymmetric. A mixture of solvents in the discrete phase is preferred for assembly of asymmetric nanoparticles.

The particles may be selected from the group consisting of metals, ceramics, glasses, and polymers; oxides, fluorides, sulfides, or phosphides thereof; and combinations of the foregoing. For example, the particles may include oxides, fluorides, sulfides, or phosphides of a metal or metalloid. In the case of particles containing polymers, the polymers may be insulators, semiconductors, or conductors (i.e., intrinsically conducting polymers). In various embodiments, hydrophobic particles are utilized. In some embodiments, moderately hydrophilic particles are utilized. In certain embodiments, oxidation-sensitive particles (e.g., PbS or PbSe particles) are used to make particle assemblies.

The particles may contain charged surface groups to enable the particles to be dispersed in a solvent. For example, charged surface groups may be selected from thiocyanate ($SCN^-$), borofluoride (e.g., tetrafluoroborate, $BF_4^-$), or hexafluorophosphate ($PF_6^-$). In some embodiments, the particles initially are covered in organic ligands such as oleic acid and undergo a ligand-exchange process to replace the ligands with more-polar ligands, which may be inorganic polar ligands. The starting ligands may also be inorganic ligands. The particles may be ligand-exchanged to render the particles soluble in the first fluid, before or during step (a). For example, the particles may be ligand-exchanged to replace a starting ligand (e.g., a starting organic ligand) with an inorganic ligand selected from the group consisting of thiocyanate, borofluoride, hexafluorophosphate, and combinations thereof.

In preferred embodiments, fully formed particles are provided for purposes of assembly, rather than combining the synthesis of the particles with the assembly process.

In some embodiments, the particles include more than one type of material. For example, the particles may have a core-shell configuration with one material in the core and a different material in the shell. In certain embodiments, the starting particles are Janus particles with two distinct materials present in each particle, such that each particle surface has two or more distinct physical properties.

The solvent for the particles, in the first fluid, may be selected from the group consisting of water, formamide, alkyl formamide (e.g., methyl formamide), dialkyl formamide (e.g., dimethyl formamide), dialkyl sulfoxide (e.g., dimethyl sulfoxide), acetonitrile, methanol, ethanol, isopropanol, 1-propanol, isobutanol, 1-butanol, 2-butanol, t-butanol, acetone, tetrahydrofuran, and combinations thereof. In some embodiments, the solvent is an aqueous solvent that contains water and at least one other species that is miscible in water. In some embodiments, the solvent is an anhydrous solvent that contains less than 1 vol %, less than 0.1 vol %, less than 0.05 vol %, or less than 0.01 vol % water.

During step (a), and/or prior to step (d), electrostatic repulsion, Brownian motion, sonication, bulk mixing (e.g., agitation or vessel rotation), and/or gas sparging, for example, may be used to keep the particles suspended in the solution of the first fluid.

The method may further include adjusting pH of the first fluid, prior to step (d). The pH of first fluid may be adjusted for particle suspendibility, to inhibit electrostatic assembly, or to induce multi-particle co-assembly, for example.

The particles may be dispersed in the first fluid by adjusting the pH to increase the zeta potential. Preferably, the particles in the first fluid exhibit a zeta potential of at least ±15 mV. In this disclosure, the notation "±15 mV" (for example) in reference to zeta potential means that the zeta potential is 15 mV in magnitude (absolute value) and may be either +15 mV or −15 mV; this does not refer to a range of values between −15 mV to 15 mV. A zeta potential of at least ±15 mV means the zeta potential is either +15 mV, or greater, or −15 mV, or more negative.

A pH-adjustment substance may be included in the first fluid. A pH-adjustment substance is a chemical that adjusts the pH of a solution, either down (more acidic) or up (more alkaline). The pH-adjustment substance may be an acid or a base. The zeta potential of the particles may be adjusted with pH. In some embodiments, the pH is adjusted to a value that is at least ±3 pH units away from the isoelectric point of the particles to be suspended or dissolved. In these or other embodiments, the zeta potential of the particles may be adjusted with a miscible solvent, or mixture of miscible solvents, to encourage better dissolution or suspendibility.

The second fluid may be an alcohol, a ketone, an ester (e.g., an aliphatic ester), an alkane (e.g., a cyclic alkane), or an acetate (e.g., an alkyl acetate), for example. In some embodiments, the second fluid is selected from the group consisting of methyl laurate, 1-butanol, t-butanol, 1-octanol, 1-hexanol, 1-decanol, ethyl ether, dibutyl ether, dihexyl ether, dioctyl ether, methyl t-butyl ether, methyl ethyl ketone, methyl amyl ketone, cyclohexane, ethyl acetate, and combinations thereof.

The first fluid and second fluid are not fully miscible with each other. In some embodiments, the first fluid is completely insoluble in the second fluid. In other embodiments, the first fluid is slightly soluble in the second fluid. The first fluid is preferably from about 0 vol % to about 20 vol % soluble in the second fluid, more preferably from about 0.1 vol % to about 15 vol % soluble in the second fluid, and most preferably from about 1 vol % to about 10 vol % soluble in the second fluid. These percentages are on a volume/volume basis, i.e. calculated as the volume of the first fluid that dissolves in a given volume of the second fluid.

The third fluid may be an alcohol, a ketone, an ester (e.g., an aliphatic ester), an alkane (e.g., a cyclic alkane), or an acetate (e.g., an alkyl acetate), for example. In some embodiments, the third fluid is selected from the group consisting of 1-octanol, 1-butanol, t-butanol, 1-hexanol, 1-decanol, ethyl ether, dibutyl ether, dihexyl ether, dioctyl ether, methyl t-butyl ether, methyl ethyl ketone, cyclohexane, ethyl acetate, and combinations thereof.

The third fluid may be an alcohol, an ester (e.g., an aliphatic ester, such as but not limited to methyl laurate), a ketone, an alkane, or a cyclic alkane, for example. In some embodiments, the third fluid is selected from the group consisting of methyl laurate, 1-butanol, t-butanol, 1-octanol, 1-hexanol, 1-decanol, ethyl ether, dibutyl ether, dihexyl ether, dioctyl ether, methyl t-butyl ether, methyl ethyl ketone, methyl amyl ketone, cyclohexane, ethyl acetate, and combinations thereof.

Preferably, the first fluid is at least partially soluble in the third fluid, and more preferably the first fluid is completely miscible with the third fluid. In some embodiments, the first fluid has a solubility in the third fluid from about 1 vol % to about 100 vol % (completely miscible), such as about 5 vol %, 10 vol %, 20 vol %, 30 vol %, 40 vol %, 50 vol %, 60 vol %, 70 vol %, 80 vol %, or 90 vol %. These percentages are on a volume/volume basis, i.e. calculated as the volume of the second fluid that dissolves in a given volume of the third fluid.

Preferably, the second fluid is at least partially soluble in the third fluid, and more preferably the second fluid is completely miscible with the third fluid. In some embodiments, the second fluid has a solubility in the third fluid from about 10 vol % to about 100 vol % (completely miscible), such as about 20 vol %, 30 vol %, 40 vol %, 50 vol %, 60 vol %, 70 vol %, 80 vol %, or 90 vol %. These percentages are on a volume/volume basis, i.e. calculated as the volume of the second fluid that dissolves in a given volume of the third fluid.

The third fluid is a co-solvent for the first and second fluids. That is, the first and second fluids are each at least partially soluble in the third fluid, as noted above. In some embodiments, the third fluid is a fully miscible co-solvent for both the first and second fluids. Because the third fluid is a co-solvent, the first fluid is at least slightly soluble (e.g., fully miscible) in a mixture of the second fluid and the third fluid—despite that the first and second fluids are not fully miscible and may even be completely insoluble with each other.

An interface-stabilization substance (e.g., a surfactant) may be contained within the first fluid and/or the second fluid. It is preferable to include the interface-stabilization substance, when present, in the second fluid. The interface-stabilization substance segregates to interfaces between the first fluid and the second fluid. The interface-stabilization substance may be selected from cationic, anionic, zwitterionic, or nonionic surfactants. In preferred embodiments, the interface-stabilization substance is a nonionic surfactant (e.g., polyglycerol alkyl ethers, polyoxyethylene alkyl ethers, or polysorbates). In some embodiments, the interface-stabilization substance is selected from particles, such as functionalized particles (e.g., $Fe_3O_4$ particles functionalized with polyacrylic acid).

In some embodiments, step (d) includes a step selected from the group consisting of vortex mixing, ultrasonic mixing, impeller mixing, microfluidizing, microfluidics droplet generation, porous-glass droplet generation, and combinations thereof. The speed of mixing and/or amount of shear energy may be used to control the droplet volume, and thus—along with particle concentration—control the microassembly volume.

In step (f), the droplets may be agitated, such as by electrostatic repulsion, Brownian motion, stirring, shaking, rolling, rotating, and/or sonication. When agitation is employed, the degree of agitation should be high enough to promote convection and dissolution (and avoid agglomeration), but not so high to shear the droplets into finer droplets, which would increase the assembly dispersity index in the final microassemblies. Preferably, the droplets do not coalesce during the time period for dissolution.

Step (f) may be conducted for a dissolving time (time period for dissolution) from about 1 second to about 10 hours, for example. In various embodiments, the method employs a dissolving time of about 10 seconds, 30 seconds, 1 minute, 2 minutes, 5 minutes, 10 minutes, 30 minutes, 1 hour, 2 hours, 3 hours, 4 hours, 6 hours, or 8 hours.

Step (f) may be conducted at a dissolving temperature from about −15° C. to about 150° C. In various embodiments, the method employs a dissolving temperature of about −10° C., −5° C., 0° C., 5° C., 10° C., 15° C., 20° C., 25° C., 30° C., 40° C., 50° C., 60° C., 70° C., 80° C., 90° C., 100° C., 110° C., 120° C., 130° C., or 140° C. The dissolving temperature may be as low as a temperature just above the freezing point of the fluid mixture. Optionally, a temperature profile is utilized during step (f), with increasing or decreasing temperature to adjust solubility properties. The dissolving temperature may be lower or higher than other temperatures utilized during the method.

In some embodiments, steps (d), (e), and (f) are continuous. In other embodiments, steps (d), (e), and (f) are conducted in batch. Combinations are possible, including semi-continuous, semi-batch, or a method in which one or more steps are done in batch while one or more steps are performed continuously. As one example, steps (d) and (e) could be a batch process to make the emulsion and combine it with the third fluid, creating an intermediate mixture. The intermediate mixture could then be continuously fed to a droplet-dissolving region to continuously form particle assemblies.

The assembly of the particles, in various embodiments, is characterized by an assembly rate (particles assembled per second) of about $10^6$, $10^7$, $10^8$, $10^9$, $10^{10}$, $10^{11}$, $10^{12}$ particles/second or higher.

The particle assemblies are optionally separated from the solution, such as by centrifugation or filtration, for example. The particle assemblies are optionally dried to remove any residual fluid. Drying may be performed with heat and/or a vacuum. In some embodiments, the particle assemblies are freeze-dried.

In some embodiments, in step (f), the number of particle assemblies equals the number of droplets. In some embodiments, the number of the particle assemblies is less than the number of the droplets. If the initial droplets all contain the same particle mass, then the final particle assemblies are expected to be nearly monodisperse, i.e. an assembly dispersity index close to or at 0. As used herein, the "assembly dispersity index" is the ratio of standard deviation of assembly volume to the mean of the assembly volume, calculated over all assemblies present. In some embodiments, the assembly dispersity index of the particle assemblies is less than 0.2, preferably less than 0.1, and more preferably less than 0.05.

See FIG. 1, which is an exemplary method flowchart for assembling particles, in some variations.

Figure 2:
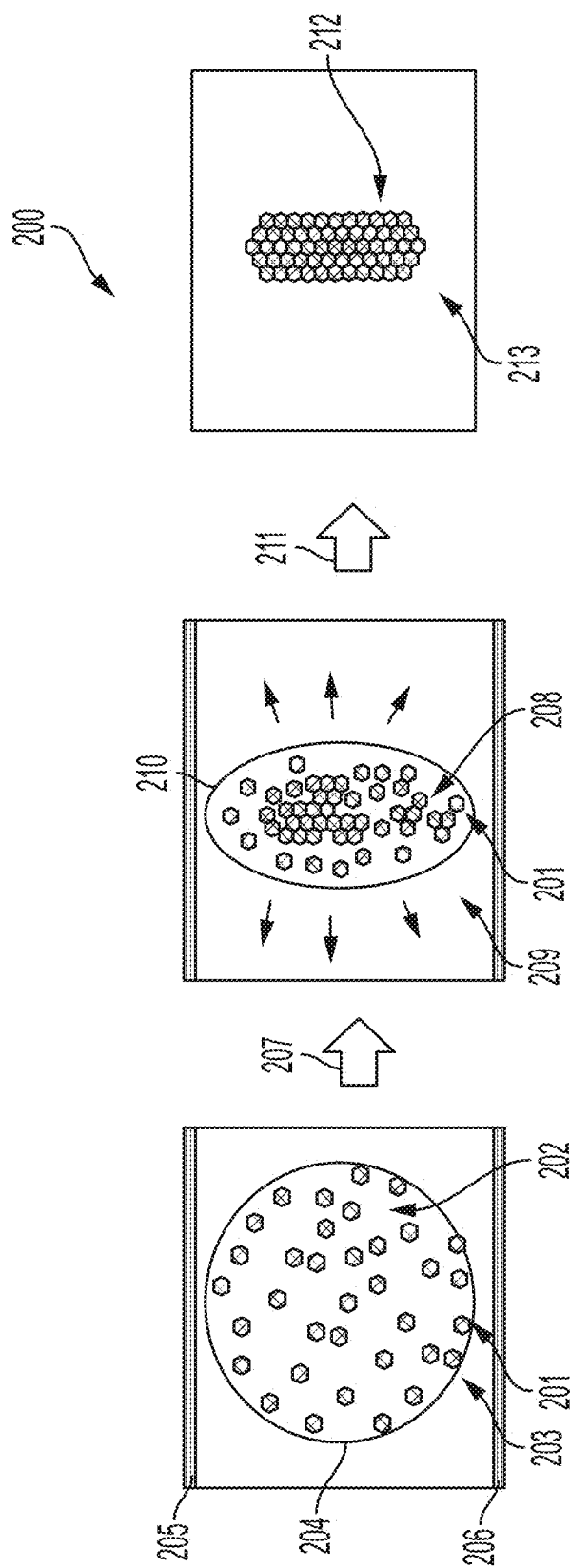
FIG. 2 is a schematic diagram of a method (and a system) for assembling a plurality of particles into elongated microassemblies through one-dimensional confined droplet dissolution, in some embodiments.

FIG. 2 is a schematic diagram of a method 200 (and a system) for assembling a plurality of particles into elongated microassemblies through one-dimensional confined droplet dissolution, in some embodiments. In FIG. 2, a droplet 204 contains a first fluid of particles 201 dissolved or suspended in a solvent 202. The droplet 204 is surrounded by a second fluid 203, forming an emulsion 204 of droplets of the first fluid (201 and 202) in a continuous phase of the second fluid 203. A first flat plate 205 and a second flat plate 206 confine the droplet 204. A third fluid 209 is added to the emulsion 204 (or equivalently, the emulsion 204 is added to the third fluid 209). The third fluid 209 is a co-solvent for the first and second fluids. After a period of time 207, and/or following conveying 207 the droplet 204 to another container, the droplet 210 begins to elongate, due to the dimensional constraints imposed by flat plates 205 and 206. The solvent 202 contained initially in droplet 204 is transported out of the dissolving droplet 210, as depicted by the outward arrows in FIG. 2, into third fluid 209. A liquid phase 208 remains in the dissolving droplet 210 until the microassembly 212 is formed. After a period of time 211, and/or following conveying 211 the dissolving droplet 210 to another container, an elongated microassembly 212 is formed, contained in a liquid mixture 213 that is or contains a mixture of solvent 202, second fluid 203, and third fluid 209. The elongated microassembly 212 may be recovered from liquid mixture 213 such as by filtering, centrifuging, drying, or other recovery steps.

Figure 3:
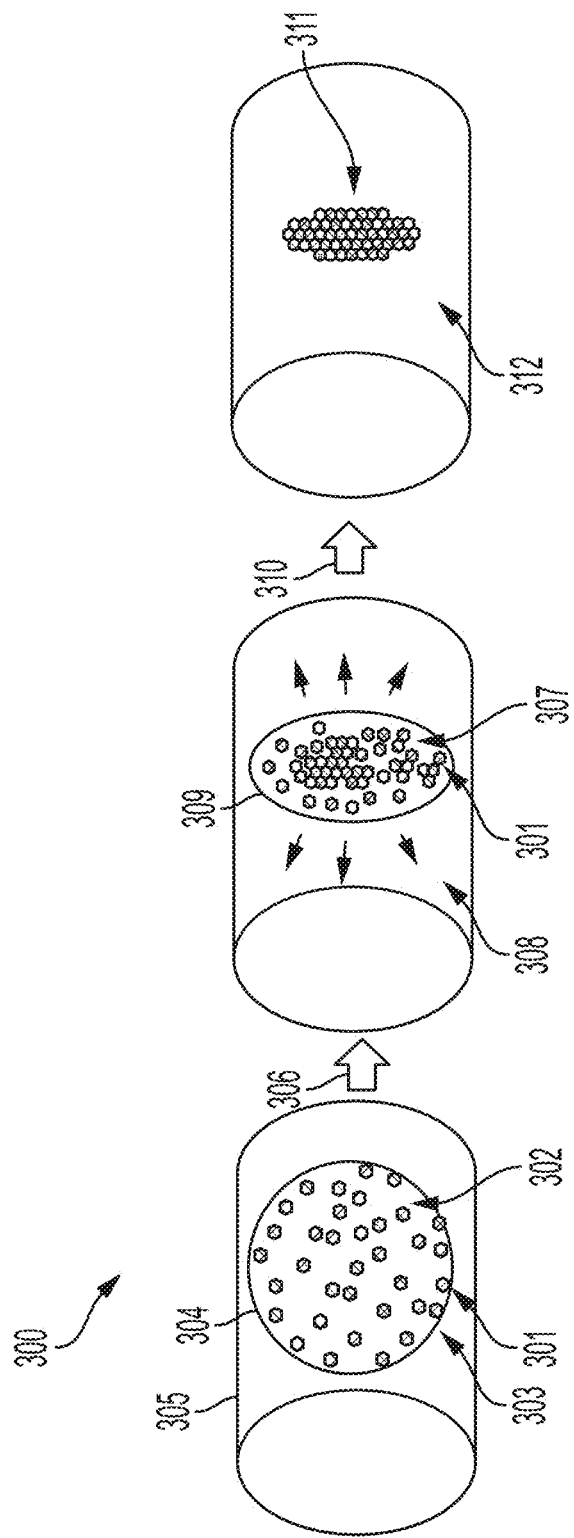
FIG. 3 is a schematic diagram of a method (and a system) for assembling a plurality of particles into biconvex lens-shaped microassemblies through two-dimensional confined droplet dissolution, in some embodiments.

FIG. 3 is a schematic diagram of a method 300 (and a system) for assembling a plurality of particles into biconvex lens-shaped microassemblies through two-dimensional confined droplet dissolution, in some embodiments. In FIG. 3, a droplet 304 contains a first fluid of particles 301 dissolved or suspended in a solvent 302. The droplet 304 is surrounded by a second fluid 303, forming an emulsion 304 of droplets of the first fluid (301 and 302) in a continuous phase of the second fluid 303. A tubular geometry 305 confines the droplet 304. A third fluid 308 is added to the emulsion 304 (or equivalently, the emulsion 304 is added to the third fluid 308). The third fluid 308 is a co-solvent for the first and second fluids. After a period of time 306, and/or following conveying 306 the droplet 304 to another container, the droplet 309 begins to elongate and form convex regions (that is, interior angles less than 180°) on opposite sides, due to the dimensional constraints imposed by tubular geometry 305. The solvent 302 contained initially in droplet 304 is transported out of the dissolving droplet 309, as depicted by the outward arrows in FIG. 3, into third fluid 308. A liquid phase 307 remains in the dissolving droplet 309 until the microassembly 311 is formed. After a period of time 310, and/or following conveying 310 the dissolving droplet 309 to another container, a biconvex lens-shaped microassembly 311 is formed, contained in a liquid mixture 312 that is or contains a mixture of solvent 302, second fluid 303, and third fluid 308. The biconvex lens-shaped microassembly 311 may be recovered from liquid mixture 312 such as by filtering, centrifuging, drying, or other recovery steps.

In some embodiments of the invention, droplet microfluidics are utilized to generate the emulsion containing a dispersed phase of droplets of the first fluid in the second fluid. For example, the first and second fluids may be introduced (such as by liquid flow or by dropping the droplets through air) into a microfluidic droplet-generating region, thereby generating a dispersed phase of the first fluid within the second fluid (i.e., an emulsion). This emulsion is conveyed from the droplet-generating region to a droplet-dissolving region to be combined with the third fluid. The third fluid may be added to the droplet-dissolving region prior to introduction of the emulsion. Alternatively, or additionally, the third fluid may be added to the droplet-dissolving region during and/or following introduction of the emulsion to the droplet-dissolving region.

A "region" may be a sub-system, a reactor, a pipe, a tube, a section (e.g., of a pipe or tube), a container, or a portion thereof, or a combination thereof. Multiple elements may collectively form a single region; for example, a tube outlet and a container disposed in flow communication with the tube outlet, may collectively form a region. A portion of an element may form a region; for example, a section of pipe may form a region.

The solvent contained in droplets of first fluid is then dissolved into a mixture of the second and third fluids, leaving the solid particles behind. As solvent leaves, the particles begin to assemble, eventually forming particle assemblies from all of the particles that were initially contained in the droplets.

The fluid phase of the droplet-dissolving region may be agitated to speed up the dissolution of solvent into third fluid. Also, agitation of the droplet-dissolving region can help keep the emulsion droplets discrete (not agglomerated) until the first fluid has fully diffused into the continuous phase (second fluid plus third fluid). Agitation may be accomplished via stirring, shaking, rolling, sonication, or a combination thereof, for example. The time period for dissolution may be from about 30 seconds to 10 minutes, for example.

Some methods utilize a device for assembling a plurality of particles into particle assemblies, the device comprising:
(a) a microfluidic droplet-generating region;
(b) a first inlet to the droplet-generating region, wherein the first inlet is configured to feed a first fluid containing particles and a solvent for the particles;
(c) a second inlet to the droplet-generating region, wherein the second inlet is configured to feed a second fluid that is not fully miscible with the first fluid;
(d) a droplet outlet from the droplet-generating region, wherein the droplet outlet is configured to withdraw droplets of the first fluid dispersed in the second fluid; and
(e) a droplet-dissolving region containing a third fluid that is a co-solvent for the first and second fluids, wherein the droplet-dissolving region is configured to receive the droplets from the droplet outlet and to remove the solvent from the droplets, thereby forming particle assemblies.

Figure 4:
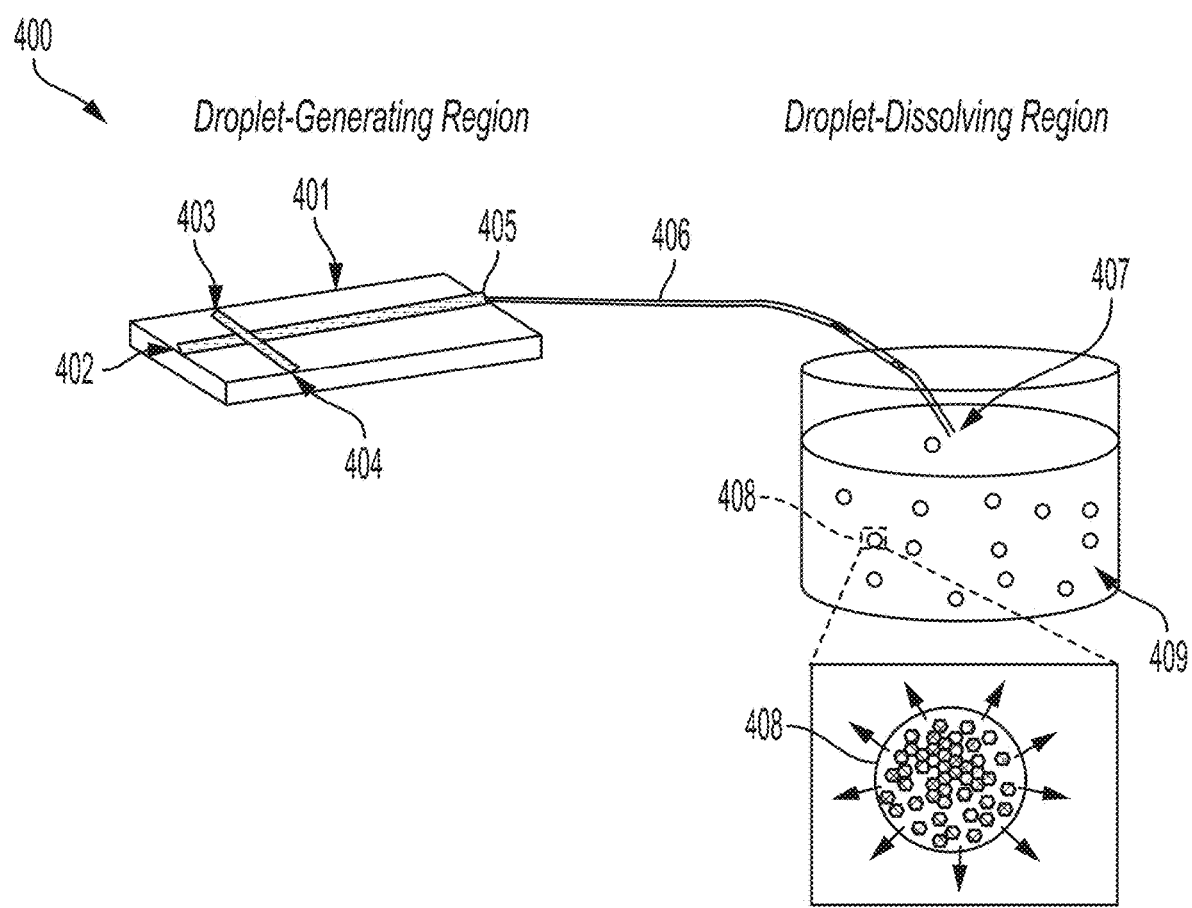
FIG. 4 is a schematic diagram of a continuous-flow microfluidic system (and a method) for assembling a plurality of particles into particle assemblies, in some embodiments.

Certain methods utilize a continuous-flow microfluidic system as depicted in FIG. 4. FIG. 4 is a schematic diagram of a continuous-flow microfluidic system 400 (and a method) for assembling a plurality of particles into particle assemblies, in some embodiments. In a droplet-generating region, there is a first inlet 402 configured to feed a first fluid, a second inlet 403 configured to feed a second fluid, and a third inlet 404 also configured to feed the second fluid. Flow channels for first and second fluids, and for droplets 408, are fabricated within a platform 401. Within the droplet-generating region, an emulsion of droplets of the first fluid in a continuous phase of the second fluid, is formed. There is a droplet outlet 405 from the droplet-generating region, configured to continuously withdraw droplets 408 and to convey them through a flow channel 406 to an inlet 407 of a droplet-dissolving region in which the emulsion and the third fluid 409 are combined. The third fluid 409 surrounds dissolving droplets 408 and dissolves both the first and second fluids, since the third fluid is a co-solvent for the first and second fluids. The droplet-dissolving region is preferably agitated. The solvent contained in droplets 408 is transported out and into third fluid 409, as depicted by the outward arrows in FIG. 4, eventually resulting in at least one assembly of particles. The assemblies may be recovered from liquid mixture 409 such as by filtering, centrifuging, drying, or other recovery steps.

A microfluidic droplet-generating region, when employed, may be selected from a flow-focusing configuration, a T-junction configuration, a dielectrophoresis droplet-generating configuration, or an electrowetting on dielectric (EWOD) configuration. This specification hereby incorporates by reference herein Teh et al., "Droplet Microfluidics" *Lab Chip,* 2008, 8, 198-220.

In a flow-focusing configuration, the dispersed and continuous phases are forced through a narrow region in the microfluidic device. Symmetric shearing by the continuous phase on the dispersed phase enables more controlled and stable generation of droplets. Properties such as channel geometry, flow rate, and viscosity all play important roles in controlling droplet generation.

In a T-junction configuration, the inlet channel containing the dispersed phase perpendicularly intersects the main channel which contains the continuous phase. The two phases form an interface at the junction, and as fluid flow continues, the tip of the dispersed phase enters the main channel. The shear forces generated by the continuous phase and the subsequent pressure gradient cause the head of the dispersed phase to elongate into the main channel until the neck of the dispersed phase thins and eventually breaks the stream into a droplet. The sizes of the droplets can be changed by altering the fluid flow rates, the channel widths, or the relative viscosity between the two phases. T-Junctions are not limited to single inlets.

Dielectrophoresis can be used to generate uniform droplets by pulling the droplets from a fluid reservoir. The fluid can be electrically neutral, and the force exerted on the uncharged fluid is caused by a non-uniform electric field. The operation principle behind dielectrophoresis-driven droplet formation is based on the phenomenon that polarizable fluids will be attracted to areas of higher electric field intensity. Dielectrophoresis functions through the contribution of three main forces: a wetting force on the interfacial line between the droplet, its surrounding medium, and the surface it contacts; a force on the interface of the two fluids; and a body force due to pressure gradients in the fluid. The size and uniformity of the droplets depend on the magnitude and the frequency of the applied voltage. The droplets do not need to be in contact with a surface, but the droplets should include a liquid of higher dielectric permittivity than its surrounding fluid.

In an electrowetting on dielectric (EWOD) configuration, droplet generation relies on the fact that an electric field can change the interfacial energy between a fluid and the surface it is in contact with. Since interfacial energy directly affects the contact angle, an electrical field can be used to reduce the contact angle and cause the fluid to wet the surface. In essence, the hydrophilicity of an area can be temporarily increased around the fluid stream. EWOD devices can be fabricated as either a one-plane or two-plane device. In a two-plane device, the ground electrode is typically placed on the top layer with the control electrodes on the bottom. Both layers include an insulating layer separating the droplets from the electrodes. Activation of the electrodes initiates fluid wetting of the channel and the fluid quickly begins to form a short liquid finger between the electrodes. The electrodes are then switched off, reverting the surface to being hydrophobic. This causes the finger to break off from the reservoir, and form a droplet. The size of the droplet is dependent on the electric field strength, frequency of the applied field, and width of the channel opening.

A microfluidic droplet-generating region, when employed, may be made using any standard microfluidic fabrication method. See, for example, Iliescu et al., "A practical guide for the fabrication of microfluidic devices using glass and silicon" *Biomicrofluidics* 2012 March; 6(1): 016505-016505-16, which is hereby incorporated by reference herein. Molded polymers (e.g. polydimethylsiloxane, polymethylmethacrylate, polycarbonate, and cyclic olefin copolymers); wet-etched, dry-etched, and/or plasma-etched glass; wet-etched, dry-etched, and/or plasma-etched silicon; molded glass; laser-cut, patterned glass; micro-sandblasted glass, and other materials may be used to fabricate the microfluidic droplet-generating region. Flow-focusing channels may be fabricated using various methods including soft lithography or the insertion of capillary sheathes into microdevices, for example.

The droplet-generating region may be made by additively manufacturing (e.g. via stereolithography) a sacrificial pattern for the fluid passages, conformally coating the passages (e.g., with parylene) or infiltrating with a bulk material, and then selectively removing the sacrificial pattern (e.g. by chemical etching, such as with NaOH). See Roper et al. "Scalable 3D Bicontinuous Fluid Networks: Polymer Heat Exchangers Toward Artificial Organs" *Adv. Mater.* 2015, which is hereby incorporated by reference, for details on this technique to make microfluidic regions.

It is emphasized that the step of generating an emulsion containing a dispersed phase of first-fluid droplets in the second fluid, is by no means limited to microfluidics droplet generation. Other techniques for generating an emulsion include, for example, vortex mixing, ultrasonic mixing, impeller mixing, microfluidizing, and porous-glass droplet generation.

As used in this specification, a "droplet-generating region" refers to a region of space wherein method step(s) of generating an emulsion is (are) performed. Likewise, a "droplet-dissolving region" refers to a region of space wherein method step(s) of dissolving the solvent from the droplets into a mixture of the second fluid and third fluid is (are) performed. The droplet-dissolving region is configured for dissolving-droplet assembly of particles, which is synonymous with shrinking-droplet assembly of nanoparticles. The droplet-dissolving region may also be referred to as a dissolution region. Note that the droplet-dissolving region is not limited to the laminar flow regime.

In some embodiments, both the first fluid and second fluid enter a droplet-generating region as continuous phases. Within the droplet-generating region, the first fluid is changed from a continuous phase to a dispersed phase (having a plurality of droplets), since the first and second fluids are not completely miscible. The second fluid typically remains a continuous phase within the droplet-generating region. In certain embodiments, at least some of the second fluid forms a second dispersed phase in the droplet-generating region, the first dispersed phase being that of the first fluid.

The droplet-generating region preferably generates droplets of the dispersed phase of the first fluid that are uniform in size. The average droplet size may be from about 1 micron to about 500 microns in diameter, for example, with a standard deviation of less than 50%, less than 25%, less than 10%, less than 5%, or less than 1% of the average droplet size. The droplet size needs to be large enough to contain multiple particles, such as at least 2, 5, 10, 50, 100, 500, $10^3$, $10^4$, $10^5$, or $10^6$ particles per droplet. The concentration of particles is typically uniform throughout the first fluid. Therefore, each of the droplets typically contains a similar number of particles, such as a standard deviation of less than 50%, less than 25%, less than 10%, less than 5%, or less than 1% of the average number of particles per droplet.

When step (d) is continuous or semi-continuous, the flow rate of the first fluid into the droplet-generating region may be selected from about 0.1 to about 100 microliters/min, such as from about 1 to about 10 microliters/min, for example. The flow rate of the second fluid into the droplet-generating region may be selected from about 1 to about 1000 microliters/min, such as from about 10 to about 100 microliters/min. for example. The flow rates of first and second fluids are preferably tuned to avoid droplet coalescence within the droplet-generating region or within a droplet-dissolving region. When droplet coalescence is a concern, the flow rate of the first fluid should typically be lower than the flow rate of the second fluid, so that there are longer separation distances between individual droplets. For example, in various embodiments, the ratio of the volumetric flow rate of the first fluid to the volumetric flow rate of the second fluid is less than 1:1, 1:2, 1:10, 1:20, 1:50, or 1:100.

In certain embodiments, the method utilizes a filter to remove a portion of the particles contained in the first fluid, prior to or in conjunction with feeding the first fluid to the droplet-generating region. Filtering out some of the particles (but not all of the particles) may be done to control particle size, to remove pre-agglomerated particles, or for other reasons.

Additional fluids (besides first and second fluids) may be introduced to the droplet-generating region. For example, the droplet-generating region may be configured to bring together multiple types of fluids inside a single droplet. These multiple fluids may be mixed prior to droplet formation, after droplet formation, or both prior to and after droplet formation. In some embodiments, the first fluid contains the particles and solvent, while an additional fluid contains a pH-adjustment substance, such as an acid or a base. The additional fluid may contain the same solvent as in the first fluid, a different solvent, or no solvent (e.g., the additional fluid may consist of the pH-adjustment substance).

The droplets that are generated in the droplet-generating region are transported to the droplet-dissolving region. The droplet transport is preferably via continuous flow (e.g., see FIG. 4), but may alternatively be via intermittent flow, semi-continuous flow, or in a batch process. In a batch process, a number of droplets may be formed, collected, and then introduced into the droplet-dissolving region. In certain embodiments, the droplet transport is achieved through the air or another gas to the droplet-dissolving region, driven by gravity or by generation of a mist using a pump, for example.

In the droplet-dissolving region, some or all of the droplets dissolve into the third fluid. Preferably, all of the droplets dissolve into the third fluid, which requires the total volume of all droplets to not exceed the volumetric solubility of the first fluid in the combination of the second fluid and third fluid in the droplet-dissolving region.

The dissolution of droplets in the droplet-dissolving region may be accomplished by diffusion, convection, or a combination thereof. In some embodiments, the droplet-dissolving region is configured for gentle agitation, such as with stirring, shaking, rolling, sonication, or a combination thereof. When agitation is employed, the degree of agitation should be high enough to promote convection and dissolution, but not so high to shear the droplets into finer droplets, which would redistribute the particles and increase the assembly dispersity index in the final microassemblies.

In preferred embodiments, the droplets do not coalesce during the time period for dissolution in the droplet-dissolving region. Avoiding coalescence may be achieved by agitation, as noted above, and/or through the use of a surfactant. Dilution of the droplets may also be done to minimize coalescence.

In some embodiments, the method employs heating or cooling one or more fluids to adjust their solubility properties. For example, the droplet-generating region and/or the droplet-dissolving region may be in thermal communication with a temperature-control component, which may be a cooler, a heater, or a unit (e.g., a heat exchanger) capable of either cooling or heating. The temperature-control component allows fluids to be cooled or heated to adjust their solubility. Multiple temperature-control components may be in thermal communication with more than one region. As one example, an emulsion may be created at low temperature (via cooling) in the droplet-generating region, and then in the droplet-dissolving region, heating is applied to tune the dissolution rate. In some embodiments, at least one of the first fluid, second fluid, and third fluid, preferably at least two of these fluids, and more preferably all of these fluids, are independently controlled by one or more temperature-control components. The temperatures of the first fluid, second fluid, and third fluid may be independently controlled to be, for example, about 0° C., 5° C., 10° C., 15° C., 20° C., 25° C., 30° C., 35° C., 40° C., or higher. In some embodiments, the temperatures of the first fluid and the second fluid are both controlled to be lower than the temperature of the third fluid.

There are a number of variations of the invention, some of which will now be further described.

The first fluid may contain more than one type of particles. There may be variations in the composition and/or size of particles in the first fluid. In some embodiments, the particles are characterized by a bimodal size distribution, i.e. there are both small particles and large particles present. For example, first particles smaller than about 100 nanometers may be present, along with second particles larger than about 10 microns, both in the first fluid. In this embodiment, core-shell microassemblies of the smaller particles on the larger particles may result.

One or more of the particles may themselves be microassemblies of nanoparticles. For example, in certain methods, relatively large (e.g., ~10 microns or larger in size) microassemblies of first nanoparticles may be formed first. These microassemblies may then be loaded along with unassembled second nanoparticles, potentially of a different composition, into the first fluid. The method is repeated, thus forming a shell of second nanoparticles on a core of assembled first nanoparticles. This method of microassembly may be repeated to build up multiple shells.

When two types of particles are present, the pH of the first fluid may be adjusted such that the two types of particles have either opposite charge or the same charge. For example, for a desired core-shell structure, the core and shell materials may be adjusted with pH to exhibit opposite surface charges, thereby encouraging electrostatic attraction. Alternatively, the core and shell materials may be adjusted with pH to exhibit surface charges of the same polarity, thereby inhibiting electrostatic assembly prior to droplet dissolution-driven assembly. For simultaneous assembly of multiple types of materials, the particles preferentially exhibit the same surface charges, or at least polarities, to encourage co-assembly and inhibit electrostatic assembly prior to droplet dissolution-driven assembly.

In some variations, the droplets are physically confined during droplet dissolution, to generate non-spherical shapes. The third fluid may be added to the emulsion of the first and second fluids, creating a mixture that is placed between parallel plates or in a tube or series or tubes, for example. The dissolution occurs while confining the droplets in one dimension or in two dimensions. For example, the droplet-dissolving region may be configured to confine the droplets in one dimension, such as with a parallel-plate geometry, to create elongated or cylindrical microassemblies rather than spherical microassemblies that are normally made from unconfined droplets (e.g., see FIG. 2). In another example, the droplet-dissolving region may be configured to confine the droplets in two dimensions, such as with a tubular geometry, to create ellipsoid or biconvex lens-shaped microassemblies (e.g., see FIG. 3).

Some variations of the invention provide an assembly of nanoparticles, wherein the assembly has a volume from 1 $\mu m^3$ to 1 $mm^3$, a packing fraction from 20% to 100%, and/or an average relative surface roughness less than 5%.

The "packing fraction" (or packing density) of an assembly is the fraction of the total assembly volume occupied by the particles in the assembly. In some embodiments, the assembly packing fraction is at least 90%. In various embodiments, the assembly packing fraction is about 25%, 30%, 35%, 40%, 45%, 50%, 55%, 60%, 65%, 70%, 75%, 80%, 85%, 90%, 95%, 99%, or 100%. The packing fraction is 100% minus the void (volume) density, i.e., tighter packing means fewer voids, and conversely, lower-density packing means a greater density of voids (open space).

"Relative surface roughness" is defined as a ratio of the size of a protrusion on the surface to the diameter of the assembly. The assembly diameter may be the effective diameter, i.e. the cube root of the volume of the assembly if the diameter is not well-defined. Preferably, the relative surface roughness is less than 10 particle diameters divided by the assembly diameter, more preferably less than 3 particle diameters divided by the assembly diameter, and most preferably less than 1 particle diameter divided by the assembly diameter. The average relative surface roughness accounts for variations in protrusion sizes, averaged across the entire surface of the assembly. In preferred embodiments, the average relative surface roughness of the assembly is less than 5%, which may be characterized as a "smooth" assembly surface. In various embodiments, the average relative surface roughness of the assembly is about, or less than about, 5%, 4%, 3%, 2%, 1%, 0.5%, or 0.1%.

The assembly may be spherical or non-spherical. In some embodiments, the assembly has an aspect ratio of at least 1.2. The aspect ratio is defined as the ratio of the maximum assembly dimension to the minimum assembly dimension. In various embodiments, the assembly has an aspect ratio of about 1.0, 1.1, 1.2, 1.3, 1.4, 1.5, 1.6, 1.7, 1.8, 1.9, 2.0, or greater. As an example, the assembly may be a biconvex ellipsoid with one axis at least 1.2 times another axis. As another example, the assembly may be a cylinder with a length that is at least 2 times the diameter.

The assembly may have a volume from about 1 $\mu m^3$ to about 1 $mm^3$ ($10^9$ $\mu m^3$) for example. In some embodiments, the assembly has a volume from about 8 $\mu m^3$ to about $8 \times 10^6$ $\mu m^3$. When there are multiple assemblies, there may be a range of assembly volumes with the average assembly volume being from about 1 $\mu m^3$ to about 1 $mm^3$, for example.

The assembly dispersity index of the particle assemblies may be less than 0.5, 0.4, 0.3, 0.2, 0.1, 0.05, 0.02, or 0.01, including 0 (perfecting monodisperse assemblies). In some preferred embodiments, the assembly dispersity index of the particle assemblies is less than 0.1.

If the particles of the assembly are asymmetric, the long axes of individual particles are preferably aligned in the same direction with respect to one another in the arrays. "Aligned" means the long axis of the particles have a full width at half maximum angular distribution with respect to the array alignment direction of at most ±20°, and more preferably at most ±10°.

In some embodiments, the particles are packed together and touching or near touching in an assembly array. The center-to-center distance between particles may be less than the width of two particles. More preferably, the center-to-center distance between particles may be less than the width of 1.5 nanoparticles.

In various embodiments, the assembly contains a material selected from the group consisting of metals, metal oxides, metal fluorides, metal sulfides, metal phosphides, semiconductors, ceramics, glasses, polymers, and combinations thereof.

The assembly is preferably free of organic ligands. That is, the assembly is preferably free of ligands containing carbon, such as hydrocarbon ligands. Carbon-containing impurities may be present unintentionally within the assembly or on the assembly surface.

In some embodiments (such as fluoride-based nanoparticles), the nanoparticles may have inorganic ligands (e.g., tetrafluoroborate, thiocyanate, or hexafluorophosphate) or other organic-free, positively or negatively charged ligands or hydrophilic ligands on the surface to help keep them dispersed in water. When present, the ligands may be loosely bound such that a zeta potential response with pH is observed.

Note that organic groups (including organic ligands) may be present in the fluid(s), which is distinct from the particles in bulk solution. Also, organic material (e.g., an organic polymer) may be contained within or on the particles, but preferably not as organic ligands. In some embodiments, substantially no organic material is present on or in the particles. "Substantially no organic material," "free of organic ligands," and like terminology should be construed to recognize that there may be impurities or other species unintentionally present in these material assemblies, which do not significantly impact the properties of the material assemblies.

The assembly is preferably not disposed on a substrate. In this context, a "substrate" means an initial, stationary solid surface (e.g., a platform) on which the particles deposit during the assembly method. Preferred embodiments do not utilize a substrate for the assembly. Note that a previous layer of particles being assembled is not considered a substrate. Also, an initial microassembly onto which particles are assembled into a core-shell assembly, is also not considered a substrate, since the microassembly is not stationary. In FIG. 2, the flat plates, while stationary, are not surfaces onto which particles deposit during assembly—rather, the flat plates geometrically constrain the transport paths of solvent being dissolved out of droplets. The flat plates are therefore not substrates as defined herein.

In some embodiments, the assembly of particles into an assembly via a method disclosed herein may be followed by charge-titration assembly of nanoparticles, thus creating a core-shell structure. In these or other embodiments, the assembly of particles into an assembly via a method disclosed herein may be preceded by charge-titration assembly of nanoparticles, thus creating a core-shell structure. Charge-titration assembly of nanoparticles is disclosed in commonly owned U.S. patent application Ser. No. 15/241,536, filed on Aug. 19, 2016, and commonly owned U.S. patent application Ser. No. 16/011,834, filed on Jun. 19, 2018, which are each hereby incorporated by reference herein. Charge-titrating assembly allows spatial and temporal control over the zeta potential of the particles to achieve alignment and organization of particles, without requiring organic ligands or a substrate.

Optionally, selective metal plating is performed on and/or inside each assembly. Selective metal plating may alternatively, or additionally, be performed on the particles prior to assembly. Selective metal plating may be done with gold, silver, copper, nickel, aluminum, or a combination thereof, for example. Exemplary metal plating processes include, but are not limited to, electroless deposition, electroplating, metal evaporation, sputtering, metal organic chemical vapor deposition, or light-induced deposition.

Example

This Example demonstrates the assembly of spherical lead sulfide (PbS) particles formed using the method of some embodiments of the invention.

A first fluid is 20 microliters dimethyl sulfoxide (DMSO) containing 50 mg/mL lead(II) sulfide (PbS) nanoparticles with thiocyanate ($SCN^-$) ligands. The PbS nanoparticles have an approximate size range of 40 nm to 80 nm. The thiocyanate ligands are present on the PbS nanoparticles at a concentration of about 20 wt %, sufficient to render the PbS nanoparticles soluble in the first fluid. A second fluid is 1 mL methyl laurate ($CH_3(CH_2)_{10}CO_2CH_3$). A third fluid is 0.8 mL 1-octanol ($C_8H_{18}O$). The first fluid and second fluid are vortex-mixed for 30 seconds. The third fluid is then added and vortex-mixed for 2 minutes.

Figure 5:
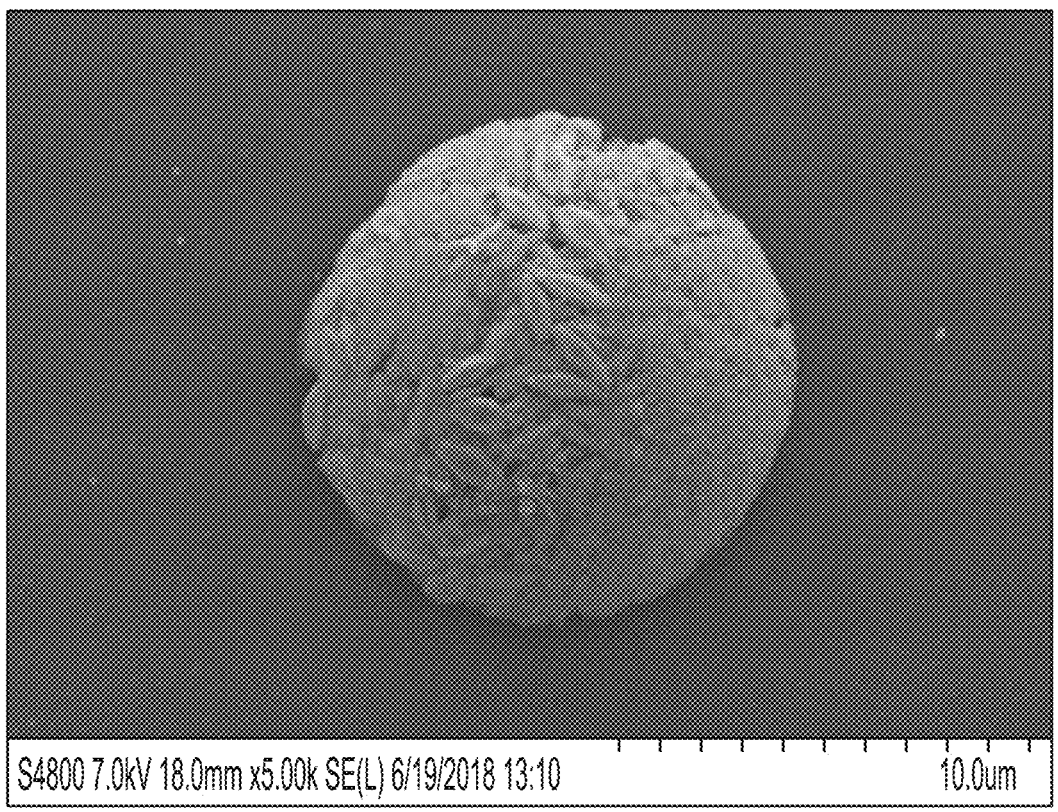
FIG. 5 is a SEM image (scale bar=10 μm) of an illustrative PbS particle assembly fabricated in the Example.

FIG. 5 is a scanning electron microscopy (SEM) image of an illustrative PbS particle assembly fabricated in this Example. The scale bar of FIG. 5 is 10 microns. FIG. 5 shows that the particle assembly is spherical. The particle assembly contains lead(II) sulfide nanoparticles.

The particle assembly diameter is estimated to be 11.5 $\mu m$. Therefore the particle assembly volume is estimated to be 800 $\mu m^3$ ($8 \times 10^{-7}$ $mm^3$). The particle assembly packing fraction is estimated to be about 80%. The average relative surface roughness of the particle assembly is estimated to be about 4%. The particle assembly is not disposed on a substrate.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A method of assembling a plurality of particles into particle assemblies, said method comprising:
   (a) obtaining a first fluid containing particles and a solvent for said particles;
   (b) obtaining a second fluid, wherein said first fluid is not fully miscible in said second fluid;
   (c) obtaining a third fluid that is a co-solvent for said first fluid and said second fluid;
   (d) combining said first fluid and said second fluid to generate an emulsion containing a dispersed phase of droplets of said first fluid in said second fluid;
   (e) adding said third fluid to said emulsion; and
   (f) dissolving said solvent from said droplets into a mixture of said second fluid and said third fluid, thereby forming particle assemblies.

2. The method of claim 1, wherein said particles are present in said first fluid in a concentration from about 1 mg/mL to about 100 mg/mL.

3. The method of claim 1, wherein said first fluid has a solubility in said second fluid from about 0.01 vol % to about 20 vol %.

4. The method of claim 1, wherein said first fluid has a solubility in said third fluid from about 1 vol % to about 100 vol % (completely miscible).

5. The method of claim 1, wherein said second fluid has a solubility in said third fluid from about 10 vol % to about 100 vol % (completely miscible).

6. The method of claim 1, wherein said solvent in said first fluid is selected from the group consisting of water, dimethyl formamide, diethyl formamide, acetonitrile, dimethyl sulfoxide, methanol, ethanol, isopropanol, 1-propanol, isobutanol, 1-butanol, 2-butanol, t-butanol, acetone, tetrahydrofuran, and combinations thereof.

7. The method of claim 1, wherein said second fluid is selected from the group consisting of methyl laurate, 1-butanol, t-butanol, 1-octanol, 1-hexanol, 1-decanol, ethyl ether, dibutyl ether, dihexyl ether, dioctyl ether, methyl t-butyl ether, methyl ethyl ketone, cyclohexane, ethyl acetate, and combinations thereof.

8. The method of claim 1, wherein said third fluid is selected from the group consisting of 1-octanol, 1-butanol, t-butanol, 1-hexanol, 1-decanol, ethyl ether, dibutyl ether, dihexyl ether, dioctyl ether, methyl t-butyl ether, methyl ethyl ketone, cyclohexane, ethyl acetate, and combinations thereof.

9. The method of claim 1, wherein an interface-stabilization substance is contained within said first fluid and/or said second fluid.

10. The method of claim 1, wherein said particles contain a starting ligand, and wherein said particles are ligand-exchanged to render said particles soluble in said first fluid, before or during step (a).

11. The method of claim 10, wherein said particles are ligand-exchanged to replace said starting ligand with an inorganic ligand selected from the group consisting of thiocyanate, borofluoride, hexafluorophosphate, and combinations thereof.

12. The method of claim 1, said method further comprising adjusting pH of said first fluid, prior to step (d).

13. The method of claim 1, wherein step (d) includes a step selected from the group consisting of vortex mixing, ultrasonic mixing, impeller mixing, microfluidizing, microfluidics droplet generation, porous-glass droplet generation, and combinations thereof.

14. The method of claim 1, wherein in step (f), said droplets are agitated.

15. The method of claim 1, wherein step (f) is conducted for a dissolving time from about 1 second to about 10 hours.

16. The method of claim 1, wherein step (f) is conducted at a dissolving temperature from about 15° C. to about 150° C.

17. The method of claim 1, wherein steps (d), (e), and (f) are continuous.

18. The method of claim 1, wherein steps (d), (e), and (f) are conducted in batch.

19. The method of claim 1, wherein in step (f), the number of said particle assemblies equals the number of said droplets.

20. The method of claim 1, wherein in step (f), the number of said particle assemblies is less than the number of said droplets.

21. An assembly of nanoparticles, wherein said assembly has a volume from 1 $\mu m^3$ to 1 $mm^3$, a packing fraction from 20% to 100%, and an average relative surface roughness less than 5%, wherein said average relative surface roughness is calculated as a ratio of size of an assembly-surface protrusion to the diameter of said assembly, averaged across the entire surface of said assembly, wherein said assembly is spherical, and wherein said assembly is not disposed on a substrate.

22. The assembly of claim 21, wherein said packing fraction is at least 90%.

23. The assembly of claim 21, wherein said average relative surface roughness is less than 0.1%.

24. The assembly of claim 21, wherein said assembly is a core-shell assembly.

25. The assembly of claim 21, wherein said assembly contains a material selected from the group consisting of metals, metal oxides, metal fluorides, metal sulfides, metal phosphides, ceramics, glasses, polymers, and combinations thereof.

26. The assembly of claim 21, wherein said assembly is free of organic ligands.

27. The assembly of claim 21, wherein said assembly consists essentially of lead(II) sulfide nanoparticles.

* * * * *